United States Patent
Takemura et al.

(10) Patent No.: US 8,384,825 B2
(45) Date of Patent: Feb. 26, 2013

(54) VIDEO IMAGE TRANSFER DEVICE AND DISPLAY SYSTEM INCLUDING THE DEVICE

(75) Inventors: Hideo Takemura, Kashiba (JP); Toshiya Aoki, Kashiba (JP); Toshiya Okamoto, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 1221 days.

(21) Appl. No.: 12/066,719

(22) PCT Filed: Jul. 6, 2006

(86) PCT No.: PCT/JP2006/313458
§ 371 (c)(1),
(2), (4) Date: Jun. 30, 2008

(87) PCT Pub. No.: WO2007/032140
PCT Pub. Date: Mar. 22, 2007

(65) Prior Publication Data
US 2009/0046990 A1 Feb. 19, 2009

(30) Foreign Application Priority Data
Sep. 15, 2005 (JP) ................................. 2005-268703

(51) Int. Cl.
H04N 7/18 (2006.01)
H04N 11/02 (2006.01)
H04N 9/74 (2006.01)

(52) U.S. Cl. ..................... 348/384.1; 348/148; 348/159; 348/584; 348/598

(58) Field of Classification Search ............. 348/211.11, 348/153, 148, 211.99, 211.13; 358/1.15
See application file for complete search history.

(56) References Cited

U.S. PATENT DOCUMENTS

| | | | | |
|---|---|---|---|---|
| 5,999,214 A * | 12/1999 | Inagaki | .................... | 348/211.12 |
| 6,246,320 B1 * | 6/2001 | Monroe | ........................ | 340/506 |
| 6,266,085 B1 * | 7/2001 | Kato et al. | ................. | 348/211.7 |
| 6,414,716 B1 * | 7/2002 | Kawai | ......................... | 348/211.3 |
| 6,535,243 B1 * | 3/2003 | Tullis | ......................... | 348/207.1 |
| 6,542,191 B1 * | 4/2003 | Yonezawa | ............... | 348/333.01 |
| 6,549,948 B1 * | 4/2003 | Sasaki et al. | .................. | 709/233 |
| 6,670,984 B1 * | 12/2003 | Tanaka et al. | ................. | 348/159 |

(Continued)

FOREIGN PATENT DOCUMENTS

| | | |
|---|---|---|
| JP | 7-7653 A | 1/1995 |
| JP | 2001-034250 A | 2/2001 |

(Continued)

OTHER PUBLICATIONS

Official communication issued in counterpart International Application No. PCT/JP2006/313458, mailed on Sep. 26, 2006.

Primary Examiner — Sinh Tran
Assistant Examiner — Selam Gebriel
(74) Attorney, Agent, or Firm — Keating & Bennett, LLP

(57) ABSTRACT

A video image transfer device includes a transfer section arranged to selectively transfer to a display device a plurality of video signals acquired from at least one image pickup device, an assigning section arranged to divide a refresh rate of the display device into portions and assign the portions among the plurality of video signals, and a transfer controller arranged to control the transfer section in such a manner that each of the video signals is transferred to the display device at a timing according to the portion of the refresh rate assigned to each of the video signals. This makes it possible to prevent a dropped frame and an insufficient resolution of an important video image.

20 Claims, 3 Drawing Sheets

U.S. PATENT DOCUMENTS

| | | | |
|---|---|---|---|
| 6,680,746 B2* | 1/2004 | Kawai et al. | 348/211.9 |
| 6,750,913 B1* | 6/2004 | Noro et al. | 348/333.02 |
| 6,760,063 B1* | 7/2004 | Kamei | 348/211.8 |
| 6,791,602 B1* | 9/2004 | Sasaki et al. | 348/159 |
| 6,891,566 B2* | 5/2005 | Marchese | 348/211.3 |
| 6,919,921 B1* | 7/2005 | Morota et al. | 348/211.11 |
| 7,502,546 B2* | 3/2009 | Elberbaum | 386/201 |
| 7,558,318 B2* | 7/2009 | Okada et al. | 375/240.01 |
| 7,768,548 B2* | 8/2010 | Silvernail et al. | 348/148 |
| 2001/0017611 A1* | 8/2001 | Moriyama | 345/100 |
| 2001/0019360 A1* | 9/2001 | Tanaka et al. | 348/211 |
| 2001/0033278 A1* | 10/2001 | Ohta et al. | 345/204 |
| 2001/0033332 A1* | 10/2001 | Kato et al. | 348/211 |
| 2002/0135682 A1* | 9/2002 | Oka et al. | 348/211.3 |
| 2003/0122949 A1* | 7/2003 | Kanematsu et al. | 348/333.01 |
| 2004/0046706 A1* | 3/2004 | Lim et al. | 345/1.1 |
| 2004/0064838 A1* | 4/2004 | Olesen et al. | 725/105 |
| 2005/0174429 A1* | 8/2005 | Yanai | 348/148 |
| 2005/0185936 A9* | 8/2005 | Lao et al. | 386/117 |
| 2006/0012682 A1* | 1/2006 | Lin | 348/207.1 |
| 2006/0170959 A1* | 8/2006 | Mizoguchi | 358/1.15 |

FOREIGN PATENT DOCUMENTS

| | | |
|---|---|---|
| JP | 2002-351438 A | 12/2002 |
| JP | 2003-219412 A | 7/2003 |
| JP | 2005-186648 A | 7/2005 |

\* cited by examiner

VIDEO IMAGE TRANSFER DEVICE AND DISPLAY SYSTEM INCLUDING THE DEVICE

BACKGROUND OF THE INVENTION

1. Field of the Invention

The present invention relates to a video image transfer device for acquiring video signals inputted by a plurality of image pickup devices and making a display device display a video image in accordance with the video signal from each image pickup device and a display system including the video image transfer device.

2. Description of the Related Art

There has been known an image pickup/display system (multiple input system) which makes it possible to simultaneously input video signals from a plurality of image pickup devices (cameras) therein and display a video image in accordance with the video signal from each image pickup device.

In a conventional general multiple input system, such video signals inputted from such plural image pickup devices are displayed on the display section in such a manner that the video signals are switched over by a switching means (for example, a switch) in order to be fed to the display section.

For example, an image pickup apparatus for in-vehicle use, in which a plurality of image signals inputted by a plurality of image pickup devices are switched over to be fed to an output device (Japanese Unexamined Patent Publication, Tokukaihei, No. 7-7653 (published on Jan. 10, 1995), is known.

Except for in-vehicle use, the fields of FA and security have adopted a liquid crystal display device in which video signals from a plurality of image pickup devices (cameras) can be inputted therein and displayed as video images. Each of the video signals is inputted into such a liquid crystal display device at a constant interval (at a constant data transfer speed). Channels for displaying the video images are independently provided.

Unfortunately, the multiple input system of this method cannot display a video image at a refresh rate (frame rate) according to a purpose or a situation because the refresh rate of each video image is fixed. That is, because the conventional multiple input system divides the refresh rate into even portions and assigns each portion to each video image, the refresh rate for each video image is the quotient of the maximum refresh rate of the display device (a total number of the frames which the display device can display in one second) divided by the number of the image pickup devices. For example, a refresh rate for each video image is lowered to 10 frames/sec in the case where the number of image pickup devices is three and the display device can display images at the refresh rate of 30 frames/sec. This can cause in an important video image a dropped frame which is perceptible to a user. Especially for an in-vehicle image pickup/display system, which is used for a driver to check the surroundings of a vehicle, a dropped frame in an important video image is unacceptable in many cases because the dropped frame could lead to a delay in the driver's check of the surroundings of the vehicle. The in-vehicle image pickup/display system for a driver to check the surroundings of a vehicle is required to display an important video image in real time.

In the conventional multiple input system, in addition, the division and assignment of an input bandwidth cannot be performed according to a purpose or a situation to each video signal since the input bandwidth of each video signal for the display device (a data amount per second of each video signal to be inputted into the display device; a bit transfer rate) is fixed. That is, the input bandwidth of each video signal is the quotient of a total input bandwidth of the display device (a total amount of data which can be inputted into the display device in one second) divided by the number of the image pickup devices since the input bandwidth is evenly divided and assigned to each video signal in the conventional multiple input system. Accordingly, the refresh rate and a resolution of each video image are low. Consequently, as described, this could result in a dropped frame, which is perceptible to a user, in an important video image or an insufficient resolution of an important video image.

SUMMARY OF THE INVENTION

In order to overcome the problems described above, preferred embodiments of the present invention provide a video image transfer device and a display system which acquire, from at least one image pickup device, a plurality of video signals of different imaging areas and cause the display device to simultaneously display the video signals as a plurality of video images wherein a dropped frame and an insufficient resolution of an important video image can be prevented.

A video image transfer device according to a preferred embodiment of the present invention for acquiring, from at least one image pickup device, a plurality of video signals of different imaging areas, and outputting the plurality of video signals to a display device, so that the display device will simultaneously display the video signals as a plurality of video images, includes: a transfer section arranged to selectively transfer to the display device the plurality of video signals acquired from at least the one image pickup device; an assigning section arranged to divide a refresh rate of the display device into portions and assign the portions to the plurality of video images; a transfer control section arranged to control the transfer section in such a manner that each of the video signals is transferred to the display device at a timing according to the portion of the refresh rate assigned to the video image corresponding to each of the video signals; and the assigning section being arranged to alter how much of the refresh rate is assigned to each of the video images.

According to the arrangement, the video image transfer device is arranged such that the refresh rate (the number of images which are refreshed in one second; a frame rate; a frequency of refreshment of a display image) is divided into portions and the portions are assigned to the plurality of video images. As such, the video image transfer device is provided with the assigning section that is arranged to alter how much of the refresh rate is assigned to each of the video images and the transfer control section that is arranged to control the transfer section in such a manner that each of the video signals is transferred to the display device at a timing according to the portion of the refresh rate assigned to the video image corresponding to each of the video signals. Therefore, the display device can display each of the video images at the refresh rate assigned to each video image by refreshing each video image upon the receipt of each video signal which is transferred by the transfer section. Thus, the assigning section makes it possible to select refresh rates of the plurality of video images to be displayed by the display device.

Accordingly, for example, it is possible to make the display device display one of the plurality of video images at a high refresh rate and, on the other hand, at a low refresh rate for the other video image(s). As a result, it is possible to make the display device display an important video image in order that a dropped frame may not be perceptible for a user, and at the same time, display the other video image(s). In addition, displaying a less important video image at a low refresh rate (i.e., with reduced frames) makes it possible to raise refresh rate(s) of the other video image(s).

The frequency of refreshing a display image is typically a refresh rate (the number of images which are refreshed in one second). The refresh rate is measured by (1) a method in which a frame refresh timing of each video image of the display device (a timing when a one-frame image is refreshed by a new one-frame image) is detected and the number of the frame refresh timings per second is measured as a refresh rate of each video image, (2) a method in which a display interval of each video image of the display device (a time interval for refreshing an image) is measured and a refresh rate of each video image is calculated by dividing one second by the measured value of the display interval, or the like.

A video image transfer device according to another preferred embodiment of the present invention for acquiring, from at least one image pickup device, a plurality of video signals of different imaging areas, and outputting the plurality of video signals to a display device, so that the display device will simultaneously display the video signals as a plurality of video images, includes: a transfer section arranged to selectively transfer to the display device the plurality of video signals acquired from at least the one image pickup device; an assigning section arranged to divide an input bandwidth of the display device into portions and assign the portions to the plurality of video signals; a transfer control section arranged to control the transfer section in such a manner that each of the video signals may be transferred to the display device at a timing according to the portion of the input bandwidth assigned to each of the video signals; and the assigning section is arranged to alter how much of the input bandwidth is assigned to each of the video signals.

Therefore, by, for example, raising the refresh rate of the most important video signal higher than the other video signal(s) and assigning the widest input bandwidth to the most important video signal, the video image transfer device can make the display device display the most important (most watched) video image at a high refresh rate and also display the other image(s). Therefore, by, for example, raising the resolution of the most important video signal higher than the other video signal(s) and assigning the widest input bandwidth to the most important video signal, the video image transfer device can make the display device display the most important (most watched) video image at a high resolution and also display the other image(s). In addition, it is possible to decrease a resolution of a specific video image by a cropping process, etc. Furthermore, by, for example, raising the resolution of the most important video signal higher than the other video signal(s) and, according to the resolution, assigning a wide input bandwidth to the most important video signal, the video image transfer device can make the display device display the most important (most watched) video image at the high resolution without a dropped frame and also display the other image(s).

The video image transfer device according to a preferred embodiment of the present invention is preferably arranged such that the transfer section acquires the plurality of video signals respectively from the plurality of image pickup devices.

According to the arrangement, the video image transfer device can make the display device display video images of more imaging areas because the video image transfer device can make the display device display the video signals from the plurality of image pickup devices.

Besides, the video image transfer device according to a preferred embodiment of the present invention preferably further includes: a plurality of holding sections arranged to respectively hold the plurality of video signals acquired from the plurality of image pickup devices, the transfer section selectively transferring to the display device the plurality of video signals held in the plurality of holding sections.

The conventional multiple input system may have a data loss during the switching of the video signals. That is, the conventional multiple input system is arranged such that, without holding the video signals inputted from the image pickup devices in input buffers, etc., a switching section switches over the video signals. This leads to simultaneous transfers of the plurality of video signals (data) from the image pickup devices to the switching section because there is no timing mediation between the video signals to be inputted into the switching section. Unless at least any one of the video signals (input data) inputted into the switching section is abandoned, this results in a collision between the video signals (data).

According to the arrangement of a preferred embodiment of the present invention above, in contrast, the video image transfer device is provided with the plurality of holding sections (buffers, etc.), each of which corresponds to each image pickup device, for holding the video signals acquired from the image pickup devices. Therefore, the timing mediation between the video signals becomes possible with a mediating circuit by mutually shifting timings when to start transferring the video signals (data) from the holding sections (buffers, etc.) to the display device. This can accordingly prevent the collision between the video signals (data).

In addition, according to the arrangement, there is no need to synchronize a transfer timing of each video signal with an input timing at which the video signal is inputted from each image pickup device because each holding section holds therein (for example, buffers in a buffer) each of the plurality of video signals acquired from the plurality of image pickup devices. Therefore, it is possible to freely select a transfer timing of each video signal within the limits of a communication bandwidth.

A display system according to a preferred embodiment of the present invention includes: the video image transfer device according to any of the above-described preferred embodiments of the present invention; and a display device for displaying the video signals transferred from the video image transfer device as video images.

Various preferred embodiments of the present invention provide a video image transfer device and a display system, which make it possible to prevent a dropped frame in an important video image and an insufficient resolution of an important video image since the video image transfer device is provided for the display system according to the arrangement.

A display system according to a preferred embodiment of the present invention may be used in a vehicle.

The in-vehicle display system (the display system according to a preferred embodiment of the present invention used in a vehicle) achieves the advantages described below.

The in-vehicle display system is required to display an important video image in real time. Also, a dropped frame in an important video image is unacceptable in many cases. According to preferred embodiments of the present invention, an important video image can be displayed in real time at a high refresh rate by an arrangement (including a case of multiple processing) such that a plurality of video images is displayed in a limited transmission bandwidth through a common transmission section.

Tracking of a moving object is important for the in-vehicle display system. In addition, the in-vehicle display system is required to have no blind spots. The display system according to a preferred embodiment of the present invention makes it possible to secure a high visibility because the display system can make the display device simultaneously display the video signals from the plurality of image pickup devices as video images in case that the plurality of video signals are acquired respectively from the plurality of image pickup devices.

Note that the vehicle here includes not only cars, but also any vehicles such as motorcycles and rail vehicles.

The assignment of the refresh rate or the input bandwidth to each video image by the assigning section may be determined by a user or, according to a situation, by the assigning section.

The assigning section may determine a level of importance of each image pickup device and, based on the level, determine how much of the refresh rate or the input bandwidth is assigned to each video image in a case where the assigning section determines the assignment according to a situation. That is, the assigning section may obtain, from a vehicle body, running condition information indicating how a vehicle is running, and alter how much of the refresh rate or the input bandwidth is assigned to the plurality of video images, in accordance with the obtained running condition information, for example, in a case where the display system according to a preferred embodiment of the present invention is used in a vehicle. More specifically, for example, in a case where the plurality of video images consists of video images of the left and the right sides of the vehicle, the assigning section may raise the refresh rate or widen the input bandwidth for a more important video image of the right side of the vehicle in accordance with the obtained running condition information indicating a right turn of the vehicle or similarly raise the refresh rate or widen the input bandwidth for a more important video image of the left side of the vehicle in accordance with the obtained running condition information indicating a left turn of the vehicle. This makes it possible to display, in the video images of the left or the right side, the image in a traveling direction at a higher refresh rate or a higher resolution. Thus, a driver can safely drive the vehicle by confirming the situation in the traveling direction in real time or in detail.

As described, preferred embodiments of the present invention make it possible to provide the video image transfer device and the display system which are for acquiring, from at least one image pickup device, a plurality of video signals of different imaging areas and making the display device simultaneously display the video signals as a plurality of video images wherein a dropped frame and an insufficient resolution of an important video image can be prevented.

These and other features, elements, steps, characteristics and advantages of the present invention will become more apparent from the following detailed description of preferred embodiments thereof with reference to the attached drawings.

DETAILED DESCRIPTION OF THE PREFERRED EMBODIMENTS

The display system according to a preferred embodiment of the present invention is a display device including a plurality of input ports, which respectively receive inputs from image pickup devices. The display system divides the input bandwidth (transfer speed) into portions and assigns the portions to the inputs from the image pickup devices and displays the video signals from the image pickup devices as video images simultaneously on different portions of a display screen at each refresh rate according to the video image from each image pickup device (according to a purpose of image display). The input bandwidth (transfer speed) of the display device is divided and assigned among the inputs from the image pickup devices, because a signal processing subsystem (a digital signal processor, a block transfer engine, etc.) and the display device deal with all the inputs of the image pickup device, and this restricts the total input bandwidth of the display device (a total of input bandwidths of all the video signals).

The display system according to a preferred embodiment of the present invention is, in other words, a display system which can switch over the plurality of video signals inputted from the plurality of image pickup devices and simultaneously display the plurality of video signals as video images wherein the refresh rate of each input video signal is independently changeable. That is, the display system according to a preferred embodiment of the present invention includes a selection section arranged to select the refresh rate of each of the video images and a switching section arranged to switch over and display the video images acquired from the plurality of image pickup devices. The display system according to a preferred embodiment of the present invention can display the plurality of video images (imaginarily) simultaneously as if a plurality of channels is operating. The display system according to a preferred embodiment of the present invention preferably includes input buffers corresponding to the image pickup devices.

A preferred embodiment of the present invention is described below with reference to FIGS. 1 and 3.

The following describes the application of a preferred embodiment of the present invention to an in-vehicle display system. Except for the in-vehicle display system, preferred embodiments of the present invention are also applicable to a manufacturing control system based on FA (Factory Automation) for monitoring a manufacturing process by video images from the plurality of image pickup devices, a security system for finding an intruder by video images from the plurality of image pickup devices, and the like.

The following describes the display system which acquires the plurality of video signals from the plurality of image pickup devices.

Figure 1:
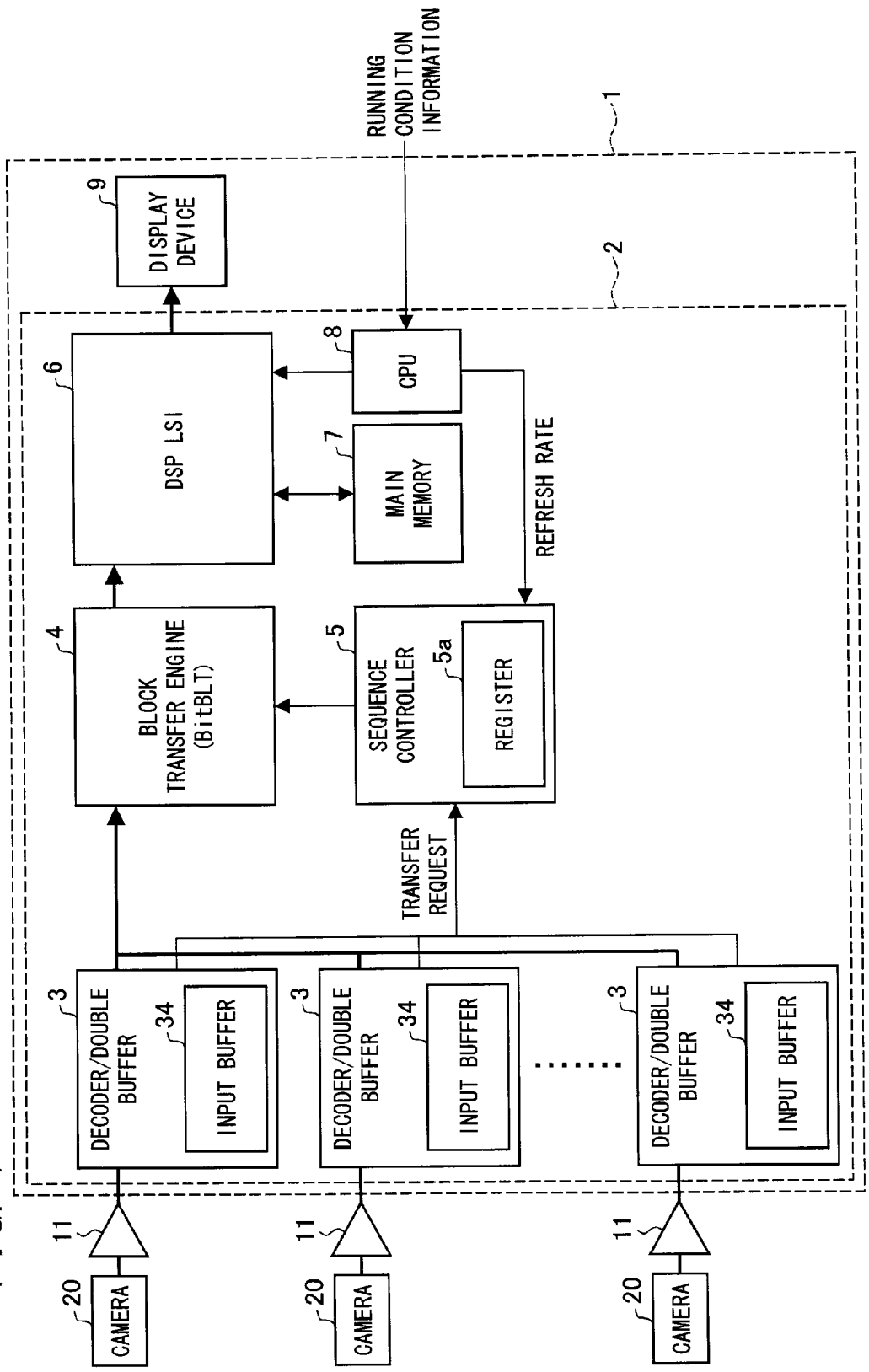
FIG. 1 is a block diagram of a substantial portion of a preferred embodiment of the display system according to the present invention.

As illustrated in FIG. 1, the in-vehicle display system 1 according to a preferred embodiment of the present invention includes a display device 9 (such as a liquid crystal display device) which simultaneously displays a plurality of video images corresponding to a plurality of digital video signals (image data) on different portions of a display screen upon the receipt of the plurality of digital video signals (image data), a plurality of input ports 11 into which the digital video signals are inputted from a plurality of cameras (image pickup devices) 20, and a video image transfer device 2 which transfers the plurality of digital video signals which is inputted into the plurality of input ports 11 to a display device 9.

The camera 20 preferably is a camera which generates a digital video signal by capturing an image, and may be, for example, a CCD (charge-coupled device) camera. The plurality of cameras 20 is for capturing images of different areas. For example, the plurality of cameras 20 may be (1) a combination of a camera 20 for capturing an image of a blind spot on a lateral side of a vehicle and the other camera 20 for capturing an image of a blind spot on a rear side of the vehicle, (2) a combination of a camera 20 for capturing an image of the left front of the vehicle and the other camera 20 for capturing an image of the right front of the vehicle, or the other combination of cameras 20.

The video image transfer device 2 includes: a decoder/double buffer 3, having input buffers 34 (holding section), each of which is provided for each camera 20 for buffering or holding each of the digital video signals inputted into the plurality of input ports 11 from the cameras 20; a main memory 7 for storing the digital video signals to be displayed; a block transfer engine (transfer section) 4 for performing block transfer (BitBLT) from input buffers 34 to the main memory 7 so as to switch over the plurality of digital video signals (held in the corresponding input buffers 34) to be transferred to the display device 9; a sequence controller (transfer control section) 5 for controlling the block transfer engine 4; a digital signal processor (DSP) large scale integrated circuit (LSI) 6 for performing digital signal processing of the digital video signals which were transferred from the decoder/double buffer 3 to the main memory 7, and then sending the processed digital video signals to the display device 9; and a CPU (central processing unit: assigning section) 8 for controlling the sequence controller (transfer control section) 5 based on information inputted from the outside such as running condition information and for controlling the DSP LSI 6. In the present preferred embodiment, the block transfer engine 4 preferably is realized as hardware.

In the display system 1, the block transfer engine 4 controls the refresh rate of each digital video signal (a frequency of refreshing, per second, a display image with the digital video signal of one frame inputted to the display device 9) by transferring each digital video signal held in the input buffer 34 to the main memory 7 at a timing adjusted under the control of the sequence controller 5.

The block transfer engine 4 reads the digital video signals out of the input buffers 34 and transfers the digital video signals to the main memory 7 by a block transfer (BitBLT). The block transfer is a process in which bits of a digital video signal in a rectangular area (bitmap data) on a source memory (input buffer 34) are transferred to a specified corresponding rectangular area on a destination memory (main memory 7). The block transfer engine 4 can transfer the digital video signals with or without modification of the digital video signals as necessary. The modification may be enlargement/reduction of the digital video signal, a logic operation (AND operation, OR operation, XOR operation, etc.) of the digital video signal with another digital video signal (bitmap data), etc.

The sequence controller 5 is a mechanism for automatically performing a series of operations of hardware in temporal order. The sequence controller 5 performs writing a value of a register 5$a$ in the block transfer engine 4, starting and stopping the block transfer engine 4, and the other operations.

In performing the transfer of the digital video signal from each input buffer 34 to the main memory 7, the block transfer engine 4 skips part of transfers requested by an input buffer 34 (the number of the transfers is the number of inputs of the video signal from the corresponding camera 20 to the corresponding input port 11) at a rate according to (the data of) each of the refresh rates stored in the register 5$a$ of the sequence controller 5, so that part of the transfers requested by the input buffer 34 is performed. As a result, the refresh rate of each digital video signal is controlled independently.

In accordance with the running condition information, etc., inputted from the outside, a CPU 8 divides the refresh rate of the display device 9 into portions and assigns the portions to the plurality of video images to be displayed by the display device 9. That is, the CPU 8 determines the refresh rate of each of the video images to be displayed by the display device 9 in such a manner that the total of the refresh rates do not exceed a maximum refresh rate of the display device 9. The CPU 8 changes how much of the refresh rate is assigned to the video images in accordance with condition information indicating a condition in the surrounding of the cameras 20, such as the running condition information inputted from the outside. With the use of the CPU 8, the determined refresh rate of each of the video images is written in the internal register 5$a$, corresponding to the video image, of the sequence controller 5, whereby the determined refresh rate of each of the video images is stored therein as the refresh rate of the input buffer 34 corresponding to the video image. In a case, for example, where the plurality of cameras 20 take video images of the right side and the left side of a vehicle, the CPU 8 may raise the refresh rate for more important video image of the right side in accordance with the obtained running condition information indicating a right turn of the vehicle or raise the refresh rate for more important video image of the left side in accordance with the obtained running condition information indicating a left turn of the vehicle. This makes it possible to display, in the video images for the left or the right side, the video image in a traveling direction at a higher refresh rate. Thus, a driver can safely drive the vehicle by confirming the situation in the traveling direction in real time or in detail.

Operations of the display system 1 are described below.

The CPU 8 writes each refresh rate corresponding to each input buffer 34 in the corresponding internal register 5$a$ of the sequence controller (mediating circuit) 5. The sequence controller 5 has a mediation function (for starting the transfers of the digital video signal from the input buffers 34 to the main memory 7 at different timings). The digital video signals from the plurality of cameras 20 are inputted into the decoder/double buffer 3 via the plurality of input ports 11, respectively. After conversion, the inputted digital video signals are stored respectively in the input buffers 34 inside the decoder/double buffer 3. Each input buffer 34 has a memory capacity for the digital video signal of one frame. Each input buffer 34 sends a transfer request to the sequence controller 5 when the memory space of each input buffer 34 is full of the digital video signal. The sequence controller 5 receives the transfer requests from each input buffer 34, thereafter mediates priorities of transfers, and selects the input buffers 34 to transfer.

At the same time, the sequence controller 5 determines a frame sampling rate based on (i) the refresh rate stored in the register 5$a$ corresponding to each input buffer 34 and (ii) a frequency of the transfer requests from the input buffer 34. More specifically, the sequence controller 5 determines the frame sampling rate as $(A-1)/A$ where the frequency of transfer requests per second from the input buffer 34 is A times as many as the refresh rate stored in the register 5$a$ corresponding to the input buffer 34. According to the frame sampling rate, the sequence controller 5 skips (rejects) $(A-1)$ transfer requests out of the A transfer requests from the input buffer 34. For example, ½ skipping is such that one skipping (rejection of the transfer request) is carried out per two transfer requests. That is, the sequence controller 5 controls the block transfer engine 4 in such a manner that one transfer of the digital video signal from the input buffer 34 to the main memory 7 is carried out per receipt of A times of transfer requests from the input buffer 34. In other words, the sequence controller 5 controls the block transfer engine 4 so that the video signal of one frame is transferred from the input buffer 34 to the main memory 7 every time A frames of the video signals are stored in the input buffer 34.

The sequence controller 5 provides the block transfer engine 4 with a source address, which is a memory address of the input buffer 34 selected as a transfer source. Then, the sequence controller 5 instructs the block transfer engine 4 to perform data transfer to that address (destination address) of the main memory 7 which is specified by the CPU 8. During a period of data transfer, the block transfer engine 4 controls the input buffer 34 selected as the transfer source and the main memory 7.

Every time the digital video signal of one frame is transferred to the main memory 7, the DSP LSI 6 reads out the digital video signal of one frame from the main memory 7, processes the read-out digital video signal, and outputs the processed digital video signal to the display device 9. The display device 9 refreshes a video image upon every input of the transferred digital video signal of one frame. Therefore, the display device 9 refreshes a video image corresponding to each digital video signal in accordance with a cycle in which the digital video signal is transferred from the input buffer 34 to the main memory 7. As a result, the display device 9 can display the video image corresponding to each digital video signal at a refresh rate stored in the register 5*a* corresponding to the digital video signal.

Thus, the display device 9 can display the plurality of video images at variable refresh rates which are written in the register 5*a* by the CPU 8. Accordingly, the display device 9 can, for example, display one of the plurality of video images at a high refresh rate (for example, at the same level as the maximum refresh rate of the display device 9) and, on the other hand, display the other video images at a low refresh rate (for example, at a refresh rate close to that of a still image). As a result, the display device 9 can display an important video image in order that a dropped frame thereof is not perceptible to a user, and at the same time, can display the other video images. As a result, a user can watch an important video image from the camera 20 in real time.

The conventional multiple input systems also have not been prepared for an advanced image display produced by a cropping process or the like of a plurality of areas, etc.

Figure 2:
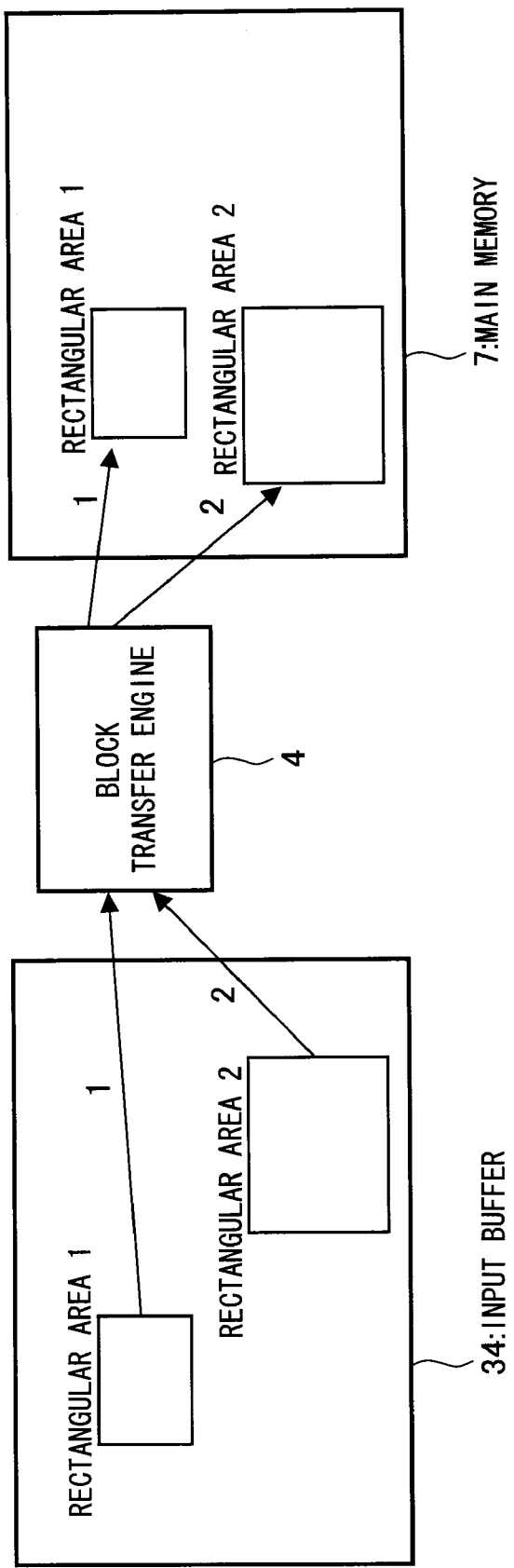
FIG. 2 is a schematic view of the cropping processing of the display system of FIG. 1.

The display system 1 of the present preferred embodiment includes the block transfer engine 4 which can realize the advanced image display produced by the cropping process or the like of the plurality of areas. The cropping of the plurality of areas is described below with reference to FIG. 2. As FIG. 2 illustrates, the cropping of the plurality of areas is a processing for transferring video image data from a plurality of transfer source areas in the specified input buffer 34 to a plurality of destination areas in the main memory 7. The plurality of transfer source areas is specified in such a manner that the CPU 8 writes in the register 5*a* (the address of) the input buffer 34 which is a transfer source, coordinate (offset address: coordinate of one vertex) of the rectangular area of the transfer source in the input buffer 34, and a horizontal and vertical size of the rectangular area to be transferred, so that these pieces of information written in the register 5*a* are set as parameters to which the block transfer engine 4 refers in order to find the specified transfer source area. The destination address (an address on the main memory 7) is specified as well as the transfer source address. The block transfer engine 4, in accordance with the parameter which is thus set, transfers video image data in a plurality of rectangular areas (digital video signals) to the main memory 7 sequentially. Thus, a plurality of partial areas of the video images taken by the cameras 20 can be simultaneously displayed on the display device 9 by specifying the plurality of rectangular areas, stored in the input buffer 34, of the video images and transferring the video image data to the main memory 7. This makes it possible to show a viewer the plurality of partial areas of the video images taken by the cameras 20 as if the plurality of partial areas is being simultaneously monitored.

The display system 1 of the present preferred embodiment allows multi-input asynchronous behavior. Combinations of the cameras to be used, the number of the cameras to be used, video image sizes, refresh rates (frame rates) are changeable according to conditions changing in real time as to the vehicle or the like, that is, the condition information indicating the condition in the surrounding of the camera 20 such as the running condition information inputted from the outside.

With reference to FIG. 1, the below describes elements and operations thereof for changing the arrangement of the cameras, the number of the cameras, and the video image size.

The combination of the cameras to be used is changed as below. The CPU 8 preliminarily sets (writes), to the register 5*a* in the sequence controller 5, information on whether or not the video signals from the plurality of cameras 20 are to be used for the image display of the display device 9 (information on the arrangement and the number of the cameras to be used). The information stored in the register 5*a* specifies, among the plurality of input buffers 34, the input buffer 34 connected to the camera 20 to be used (the input buffer 34 from which data is transferred to the main memory 7) as a buffer to be used. Based on the information stored in the register 5*a*, the block transfer engine 4 performs proper mediation in which, among the transfer requests from the plurality of input buffers 34, the transfer requests from the input buffer 34 specified to be used are accepted and the transfer requests from the other input buffers 34 are rejected. By this, the display device 9 displays only the video signal held in the input buffer 34 specified to be used. In such a manner, the number and the combination of the cameras 20 to be used can be selected and the display device 9 can display the video images from the selected cameras 20.

Selection of the video image size is preferably performed as described below. Initially, the information for specifying the video image size (or information for specifying the rectangular area to be transferred) is preliminarily set to (written in) the register 5*a* of the sequence controller 5 by the CPU 8. The selection of the video image size can be performed by transferring the video image data of the rectangular area from the input buffer 34 to the main memory 7 by the block transfer engine 4 through the cropping, etc., when performing the block transfer, the video image data having the video image size specified by the value in the register 5*a*.

An internal structure of the decoder/double buffer 3 is described below with reference to FIG. 3.

Figure 3:
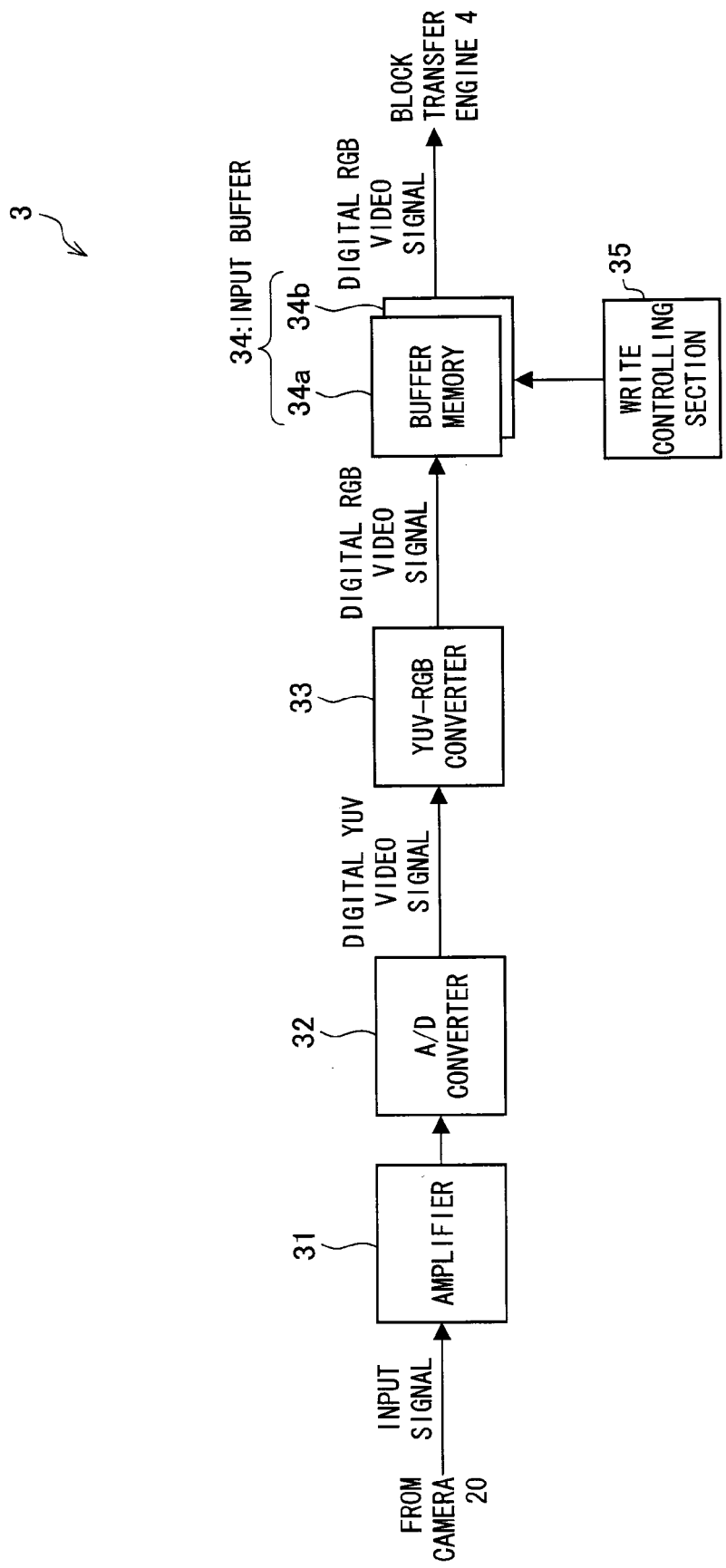
FIG. 3 is a block diagram of the structure of a decoder/double buffer provided for the display system of FIG. 1.

As FIG. 3 illustrates, the decoder/double buffer 3 includes an amplifier 31 for amplifying an analog video signal inputted from the camera 20 (for example, the amplifier 31 may be an amplifier IC which can process an analog video signal of the NTSC (National Television System Committee) format), an A/D converter (converter) 32 for performing A/D (analog-digital) conversion to convert the analog video signal into a digital video signal in the YUV format (a format to express colors by three kinds of information which are a brightness signal (Y), a difference (U) between the brightness signal and a blue color component, and a difference (V) between the brightness signal and a red color component), a YUV-RGB converter 33 for converting the digital video signal in the YUV format into a digital video signal in the RGB format, an input buffer 34 including two buffer memories 34*a* and 34*b*, and a write controlling section 35 for alternatively writing the digital RGB video signal (RGB data) in either the buffer memory 34*a* or the buffer memory 34*b*.

The input buffer 34 includes two buffer memories 34a and 34b in order to allow the block transfer engine 4 and the write controlling section 35 to use the two buffer memories 34a and 34b alternatively. Specifically, the write controlling section 35 writes the digital RGB video signal (RGB video image data) in either one of the buffer memories 34a and 34b. When the one of the buffer memories (34a or 34b) is full of the digital RGB video signal (RGB video image data) of one frame, the write controlling section 35 writes the digital RGB video signal (RGB video image data) in the other buffer memory (34b or 34a). On the other hand, the buffer memory (34a or 34b) filled with data sends a transfer request (BitBLT request; readout request) to the sequence controller 5, empties the buffer memory itself by transferring (ejecting) the data stored therein to the block transfer engine 4, and becomes prepared for the next input.

Thus, the input buffer 34 is a double buffer such that writing and reading are performed on two buffer memories 34a and 34b, respectively and alternatively in order to allow the writing and reading to be performed without hindering each other.

The present invention is not limited to the preferred embodiments described above, but may be varied in many ways within the scope of the claims below.

For example, the present invention is not limited to the arrangement described above such that the plurality of video signals are acquired respectively from the plurality of image pickup devices. This invention is applicable to any display system for simultaneously displaying a plurality of video images taken by at least one image pickup device and also, a display system for simultaneously displaying different areas of a video image taken by one image pickup device. For example, the following systems and the like are such display systems for simultaneously displaying different areas of a video image taken by one image pickup device.

A display system for simultaneously displaying a video image from an image pickup device and a video image cropped (trimmed) from the video image from the image pickup device, the cropped video image showing a portion that is especially watched (for example, an approaching obstacle, etc.).

A display system according to a preferred embodiment of the present invention displays a plurality of video images into which a video image taken by an image pickup device is divided (for example, two video images which are a video image of a left corner of a bumper of a vehicle and a video image of a right corner of the bumper, and the like).

A display system according to a preferred embodiment of the present invention displays the entire video image taken by an image pickup device and a video image which enlarges a portion of the entire video image. This system includes a component having a function of enlarging an image, for example, the block transfer engine.

In the description above, the CPU 8 divides the refresh rate of the display device 9 into portions and assigns the portions to the plurality of video images; the sequence controller 5 controls the block transfer engine 4 in such a manner that each video signal is transferred to the main memory 7 (to the display device 9) at a timing according to the portion of the refresh rate assigned to the video image corresponding to each video signal; and the CPU 8 can change how much of the refresh rate is assigned to the video images. However, this arrangement may be such that the input bandwidth of the display device 9 is divided into portions and the portions are assigned to the plurality of video signals; the sequence controller 5 controls the block transfer engine 4 in such a manner that each video signal is transferred to the main memory 7 (to the display device 9) at a timing according to the portion of the input bandwidth assigned to each video image; and the CPU 8 can alter how much of the input bandwidth is assigned to each video signal.

The display system 1 is arranged such that the block transfer engine 4 transfers the digital video signal to the main memory 7. However, the block transfer engine 4 may directly transfer the digital video signal to the display device 9 in a case where the display device 9 has a memory.

The input buffer 34 may be omitted although the input buffer 34 is provided for the display system 1 above.

The preferred embodiments and specific examples of implementation discussed in the foregoing detailed explanation serve solely to illustrate the technical details of the present invention, which should not be narrowly interpreted within the limits of such preferred embodiments and specific examples, but rather may be applied in many variations within the spirit of the present invention, provided such variations do not exceed the scope of the patent claims set forth below.

The present invention is applicable to a display system, for example, for displaying a video image from a plurality of image pickup devices (or a plurality of video images from one image pickup device), which display system is preferably provided on a dashboard of a vehicle and to manufacturing of a video image transfer device used in the display system.

The invention claimed is:

1. A video image transfer device for acquiring, from at least one image pickup device, a plurality of video signals of different imaging areas, and outputting the plurality of video signals to a display device, so that the display device will simultaneously display the video signals as a plurality of video images, the video image transfer device comprising:
    a transfer section arranged to selectively transfer to the display device the plurality of video signals acquired from at least the one image pickup device;
    an assigning section arranged to divide a refresh rate of the display device into different portions and assign the different portions to respective ones of the plurality of video images;
    a transfer controller arranged to control the transfer section in such a manner that each of the video signals is transferred to the display device at a timing according to the portion of the refresh rate assigned to the video image corresponding to each of the video signals; and
    the assigning section is arranged to alter how much of the refresh rate is assigned to each of the video images; wherein
    the assigning section is arranged to obtain condition information indicating a state of motion of the at least one image pickup device and to, according to the obtained condition information, alter how much of the refresh rate is assigned to each of the plurality of video signals.

2. A video image transfer device for acquiring, from at least one image pickup device, a plurality of video signals of different imaging areas, and outputting the plurality of video signals to a display device, so that the display device will simultaneously display the video signals as a plurality of video images, the video image transfer device comprising:
    a transfer section arranged to selectively transfer to the display device the plurality of video signals acquired from at least the one image pickup device;
    an assigning section arranged to divide an input bandwidth of the display device into different portions and assign the different portions to respective ones of the plurality of video signals;

a transfer controller arranged to control the transfer section in such a manner that each of the video signals may be transferred to the display device at a timing according to the portion of the input bandwidth assigned to each of the video signals; and the assigning section being arranged to alter how much the input bandwidth is assigned to each of the video signals; wherein the assigning section is arranged to obtain condition information indicating a state of motion of the at least one image pickup device and to, according to the obtained condition information, alter how much of the input bandwidth is assigned to each of the plurality of video signals.

3. The video image transfer device of claim 1, wherein the transfer section is arranged to acquire the plurality of video signals respectively from the plurality of image pickup devices.

4. The video image transfer device of claim 3, further comprising:

a plurality of holding sections arranged to respectively hold the plurality of video signals acquired from the plurality of image pickup devices;

the transfer section is arranged to selectively transfer to the display device the plurality of video signals held in the plurality of holding sections.

5. The video image transfer device of claim 1, wherein the transfer section is arranged to select, from the plurality of video signals acquired from the image pickup devices, which video signal is transferred to the display device.

6. The video image transfer device of claim 5, wherein the transfer section is arranged to obtain condition information indicating a condition in a surrounding area of the image pickup device and to, according to the obtained condition information indicating the condition in the surrounding area, select the video signal to be transferred to the display device.

7. The video image transfer device of claim 1, wherein the transfer section is arranged to change a video image size of the video signal to be transferred to the display device.

8. The video image transfer device of claim 7, wherein the transfer section is arranged to obtain condition information indicating a condition in a surrounding area of the image pickup device and to, according to the obtained condition information indicating the condition in the surrounding area, change a video image size of the video signal to be transferred to the display device.

9. The video image transfer device of claim 1, wherein:

the transfer section is arranged to receive the video signal from the image pickup device provided to a vehicle; and the condition information indicating the state of motion of the image pickup device includes running condition information indicating how a vehicle, on which the image pickup device is mounted, is moving.

10. A display system, comprising:
a video image transfer device of claim 1; and
a display device arranged to display the video signals transferred from the video image transfer device as video images.

11. The display system of claim 10, wherein the display system is used in a vehicle.

12. The video image transfer device of claim 2, wherein the transfer section is arranged to acquire the plurality of video signals respectively from the plurality of image pickup devices.

13. The video image transfer device of claim 12, further comprising:

a plurality of holding sections arranged to respectively hold the plurality of video signals acquired from the plurality of image pickup devices; and the transfer section is arranged to selectively transfer to the display device the plurality of video signals held in the plurality of holding sections.

14. The video image transfer device of claim 2, wherein the transfer section is arranged to select, from the plurality of video signals acquired from the image pickup devices, which video signal is transferred to the display device.

15. The video image transfer device of claim 14, wherein the transfer section is arranged to obtain condition information indicating a condition in a surrounding area of the image pickup device and to, according to the obtained condition information indicating the condition in the surrounding area of the image pickup device, select the video signal to be transferred to the display device.

16. The video image transfer device of claim 2, wherein the transfer section is arranged to change a video image size of the video signal to be transferred to the display device.

17. The video image transfer device of claim 16, wherein the transfer section is arranged to obtain condition information indicating a condition in a surrounding area of the image pickup device and to, according to the obtained condition information indicating the condition in the surrounding area of the image pickup device, change a video image size of the video signal to be transferred to the display device.

18. The video image transfer device of claim 2, wherein:

the transfer section is arranged to receive the video signal from the image pickup device provided to a vehicle; and the condition information indicating the state of motion of the image pickup device includes running condition information indicating how a vehicle, on which the image pickup device is mounted, is moving.

19. A display system, comprising:
a video image transfer device of claim 2; and
a display device arranged to display the video signals transferred from the video image transfer device as video images.

20. The display system of claim 19, wherein the display system is used in a vehicle.

* * * * *